US012697666B2

(12) United States Patent
Strauchmann et al.

(10) Patent No.: US 12,697,666 B2
(45) Date of Patent: *Aug. 4, 2026

(54) CUTTING TOOL

(71) Applicant: Kennametal Inc., Latrobe, PA (US)

(72) Inventors: Christian Strauchmann, Eggolsheim (DE); Jürgen Schwägerl, Vohenstrauss (DE); Herbert Rudolf Kauper, Erlangen (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,960

(22) Filed: Nov. 8, 2023

(65) Prior Publication Data

US 2024/0066611 A1 Feb. 29, 2024

Related U.S. Application Data

(63) Continuation of application No. 17/031,050, filed on Sep. 24, 2020, now Pat. No. 11,858,053.

(30) Foreign Application Priority Data

Sep. 26, 2019 (DE) .......................... 102019126051.5

(51) Int. Cl.
B23B 51/02 (2006.01)

(52) U.S. Cl.
CPC .......... B23B 51/02 (2013.01); B23B 2251/04 (2013.01); B23B 2251/14 (2013.01); B23B 2251/40 (2013.01)

(58) Field of Classification Search
CPC .......... B23B 2251/047; B23B 2251/04; B23B 2251/12; B23B 2251/14; B23B 2251/18; B23B 51/02; Y10T 408/9097
USPC ......................................................... 408/230
See application file for complete search history.

(56) References Cited

U.S. PATENT DOCUMENTS

| | | | | |
|---|---|---|---|---|
| 4,342,368 A | * | 8/1982 | Denman ................. | B23B 51/02 |
| | | | | 175/420.1 |
| 4,561,813 A | * | 12/1985 | Schneider ............... | B23B 51/02 |
| | | | | 408/230 |
| 4,714,383 A | | 12/1987 | Shimomura et al. | |

(Continued)

FOREIGN PATENT DOCUMENTS

| | | |
|---|---|---|
| CN | 101282806 A | 10/2008 |
| CN | 101821044 A | 9/2010 |

(Continued)

OTHER PUBLICATIONS

Dec. 24, 2021 Non-Final Office Action U.S. Appl. No. 17/031,050, 15 Pages.

(Continued)

*Primary Examiner* — Sunil K Singh
*Assistant Examiner* — Michael Vitale
(74) *Attorney, Agent, or Firm* — John A. Wilaj, Jr.

(57) ABSTRACT

Cutting tool for the rotary machining of workpieces, in particular a twist drill, with a cutting tip which has at least one main cutting edge and at least one free surface, wherein a flank face adjoins the main cutting edge radially to the outside, and wherein a flank angle of the flank face increases in a radially outward direction.

11 Claims, 4 Drawing Sheets

(56) References Cited

U.S. PATENT DOCUMENTS

| | | | | |
|---|---|---|---|---|
| 4,759,667 | A * | 7/1988 | Brown | B23B 51/02 |
| | | | | 408/230 |
| 6,846,135 | B2 * | 1/2005 | Kuroda | B23C 5/10 |
| | | | | 407/53 |
| 7,137,461 | B2 | 11/2006 | Meierhofer | |
| 7,530,772 | B2 | 5/2009 | Reinhardt et al. | |
| 7,861,807 | B2 | 1/2011 | Probst et al. | |
| 9,308,591 | B2 | 4/2016 | Volokh et al. | |
| 9,440,296 | B2 | 9/2016 | Hufschmied | |
| 9,975,183 | B2 | 5/2018 | Harif | |
| 10,058,934 | B2 | 8/2018 | Burton et al. | |
| 10,207,342 | B2 | 2/2019 | Mura et al. | |
| 10,300,534 | B2 | 5/2019 | Kawakami et al. | |
| 2001/0013431 | A1 * | 8/2001 | Huber | B23B 51/00 |
| | | | | 175/420.1 |
| 2003/0000745 | A1 * | 1/2003 | Huber | B23B 51/02 |
| | | | | 175/323 |
| 2003/0180104 | A1 | 9/2003 | Kuroda et al. | |
| 2005/0135887 | A1 * | 6/2005 | Borschert | B23B 51/02 |
| | | | | 408/230 |
| 2006/0269372 | A1 * | 11/2006 | Goshima | B23B 51/02 |
| | | | | 408/230 |
| 2009/0238649 | A1 * | 9/2009 | Kruszynski | B23B 27/141 |
| | | | | 407/62 |
| 2009/0279965 | A1 * | 11/2009 | Soittu | B23B 51/02 |
| | | | | 408/230 |
| 2010/0135741 | A1 | 6/2010 | Probst et al. | |
| 2011/0170974 | A1 | 7/2011 | Masuda | |
| 2013/0142583 | A1 * | 6/2013 | Arai | B24B 3/32 |
| | | | | 408/229 |
| 2014/0023448 | A1 * | 1/2014 | Yanagida | B23B 51/02 |
| | | | | 408/229 |
| 2014/0133926 | A1 | 5/2014 | Budda et al. | |
| 2015/0209877 | A1 | 7/2015 | Hufschmied | |
| 2015/0367427 | A1 | 12/2015 | Burton et al. | |
| 2016/0052069 | A1 | 2/2016 | Kauper | |
| 2016/0214186 | A1 | 7/2016 | Mura et al. | |
| 2017/0066062 | A1 | 3/2017 | Takahashi et al. | |
| 2020/0108449 | A1 * | 4/2020 | Brodski | B23B 51/02 |
| 2021/0031277 | A1 | 2/2021 | Watanabe et al. | |
| 2021/0205900 | A1 * | 7/2021 | Miller | B23B 51/02 |

FOREIGN PATENT DOCUMENTS

| | | | | | |
|---|---|---|---|---|---|
| CN | 101970158 | A | | 2/2011 | |
| CN | 104907611 | A | | 9/2015 | |
| CN | 106238783 | A | | 12/2016 | |
| CN | 106457422 | A | | 2/2017 | |
| CN | 106925820 | A | | 7/2017 | |
| CN | 107414149 | A | | 12/2017 | |
| CN | 107984005 | A | | 5/2018 | |
| CN | 108698141 | A | | 10/2018 | |
| DE | 102009035625 | A1 | | 2/2011 | |
| DE | 102015210817 | A1 | | 12/2016 | |
| DE | 102016221363 | A1 | | 3/2018 | |
| EP | 1273374 | A1 * | | 1/2003 | B23B 51/0493 |
| EP | 3150313 | A1 | | 4/2017 | |
| JP | S57102711 | A | | 6/1982 | |
| JP | 2012061586 | A | * | 3/2012 | |
| WO | WO-2019021785 | A1 * | | 1/2019 | B23B 51/02 |
| WO | WO-2019131177 | A1 * | | 7/2019 | B23B 51/02 |

OTHER PUBLICATIONS

Jun. 2, 2022 Final Office Action U.S. Appl. No. 17/031,050, 14 Pages.

Sep. 19, 2022 Advisory Action (PTOL-303) U.S. Appl. No. 17/031,050 3 pages.

Nov. 9, 2022 Non-Final Office Action U.S. Appl. No. 17/031,050, 10 Pages.

Apr. 14, 2023 Foreign Office Action Chinese Application No. CN202010816529.6, 15 Pages.

May 5, 2023 Final Office Action U.S. Appl. No. 17/031,050 10 Pages.

Aug. 16, 2023 Notice of Allowance for U.S. Appl. No. 17/031,050, 7 Pages.

Nov. 7, 2023 Foreign Office Action Chinese Application No. CN202010816529, 9 Pages.

Notice of Allowance for U.S. Appl. No. 17/031,050, 2 Pages.

Dec. 4, 2025 Foreign Office Action Indian Application No. IN202044034823, 06 Pages.

Armarego E.J.A and Wright J.D., "Manufactured General Purpose Twist Drill Point Geometry-i. Preliminary Appraisal of Variations," Journal of Production Engineering, Received Dec. 4, 1977, vol. 2, pp. 1-19.

Satoshi Ema., "Effects of Twist Drill Point Geometry on Torque and Thrust," Science Report of the Faculty of Education, Gifu University (Natural Science), Mar. 2012, pp. 165-174.

* cited by examiner

A-A

B-B

C-C

D-D

CUTTING TOOL

RELATED APPLICATION DATA

The present application is a continuation of application Ser. No. 17/031,050, filed Sep. 24, 2020, which in turn claims priority pursuant to 35 U.S.C. § 119(a) to German Patent Application Number 102019126051.5 filed Sep. 26, 2019, and are incorporated herein by reference in its entirety.

FIELD

The invention relates to a cutting tool for the rotary machining of workpieces, in particular a twist drill.

BACKGROUND

Cutting tools for the rotary machining of workpieces are often subject to high wear, especially when the machined workpieces are made of a particularly hard material such as steel.

In rotating cutting tools with a frontal cutting edge, the greatest wear occurs in the area of a radially outer cutting corner, because the relative speed, and consequently the friction and the stresses in the material, are greatest in this area.

Once wear has started in the area of the cutting corner, the stresses and friction increase even more due to the increased surface roughness caused by the wear that has occurred. In addition, the strength of the cutting tool decreases due to wear, so that parts can break out of the cutting tool when machining a workpiece. The quality of a bore produced with the cutting tool is then no longer adequate, and the cutting tool has to be replaced.

SUMMARY

It is therefore an object of the invention to provide a cutting tool for the rotary machining of workpieces that has a particularly long service life.

This object is achieved according to the invention with a cutting tool for the rotary machining of workpieces, in particular a twist drill, with a cutting tip which has at least one main cutting edge and at least one free surface, wherein a flank face adjoins the main cutting edge radially to the outside, and wherein a flank angle of the flank face increases in a radially outward direction. The flank angle in particular increases from the main cutting edge to a cutting corner.

The flank face is in particular a secondary free surface.

In conventional rotating cutting tools, wear is greatest on the cutting corner as this is where the greatest amount of friction occurs. Due to the increasing flank angle of the flank face, the cutting tool according to the invention has more clearance in a radially outer area, in particular in the area of the cutting corner. There is consequently less wear, because the friction during the machining of a workpiece is reduced in comparison to conventional cutting tools. The friction is in particular reduced in an area behind the cutting corner in the direction of rotation.

The flank angle preferably increases from a center of the cutting tool, in particular from a cutting tip, to the cutting corner.

Since the flank face slopes away radially outward, for example, the flank angle can also increase viewed in axial direction, in particular from the cutting tip.

The flank angle is, for example, viewed in a section perpendicular or approximately perpendicular to the longitudinal axis of the cutting tool. The flank angle is smaller in a sectional plane that is closer to a cutting tip than in a sectional plane that is further away from the cutting tip.

For example, the flank angle is measured in the sectional plane relative to a perpendicular that extends perpendicular to a surface of the flute at the transition from a flute to the flank face.

Since the flank angle increases from the inside radially outward, the cutting tool is also sufficiently stable in the area of the main cutting edge, because there is enough material in the area of the main cutting edge.

The flank angle preferably increases continuously. As a result, the cutting tool and/or the flank angle can be produced particularly easily and dimensionally accurately.

According to one embodiment, measured in a section perpendicular to the main cutting edge, the flank angle increases toward the cutting corner, in particular from radially inside to radially outside. The flank angle measured in a section perpendicular to the main cutting edge is also referred to as an effective flank angle.

The flank angle increases by at least 2°, for example, in particular at least 4°, for example from 8° to 12°. By increasing the flank angle in this way, sufficient clearance of the cutting tool is achieved in the area of the cutting corner without negatively affecting the stability of the cutting tool.

According to one embodiment, the main cutting edge merges into an edge of the flank face, whereby the flank angle increases along the edge. This means that the increasing flank angle of the main cutting edge provides more clearance in a radially outer area.

The edge of the flank face can be straight or curved.

According to one embodiment, the cutting tool comprises at least one guide bevel, which extends along a flute and opens into the flank face. The guide bevels are used to machine the lateral surfaces of the bore and to guide the cutting tool in the bore.

The cutting tool can also comprise a back-milling, adjacent to the free surface, which opens into the flank face. This can be regarded as a further secondary free surface, in addition to the flank face, and is also referred to as the back. The back-milling forms the transition from the frontal main free surface to the outer surface of the cutting tool. The back-milling can prevent the cutting tool from getting stuck in the workpiece during machining.

In a plan view onto the flank face, the flank face is approximately L-shaped. Such a shape of the flank face is particularly advantageous with respect to reducing friction when machining a workpiece.

According to a further embodiment, the corner radius is not tangent to the periphery and/or the free surface. The corner radius is in particular not tangent to any of the adjacent surfaces. This also helps to reduce wear in the area of the cutting corner.

BRIEF DESCRIPTION OF THE DRAWINGS

Further advantages and features of the invention result from the following description and from the accompanying drawings, to which reference is made. The drawings show.

DETAILED DESCRIPTION

Figure 1:
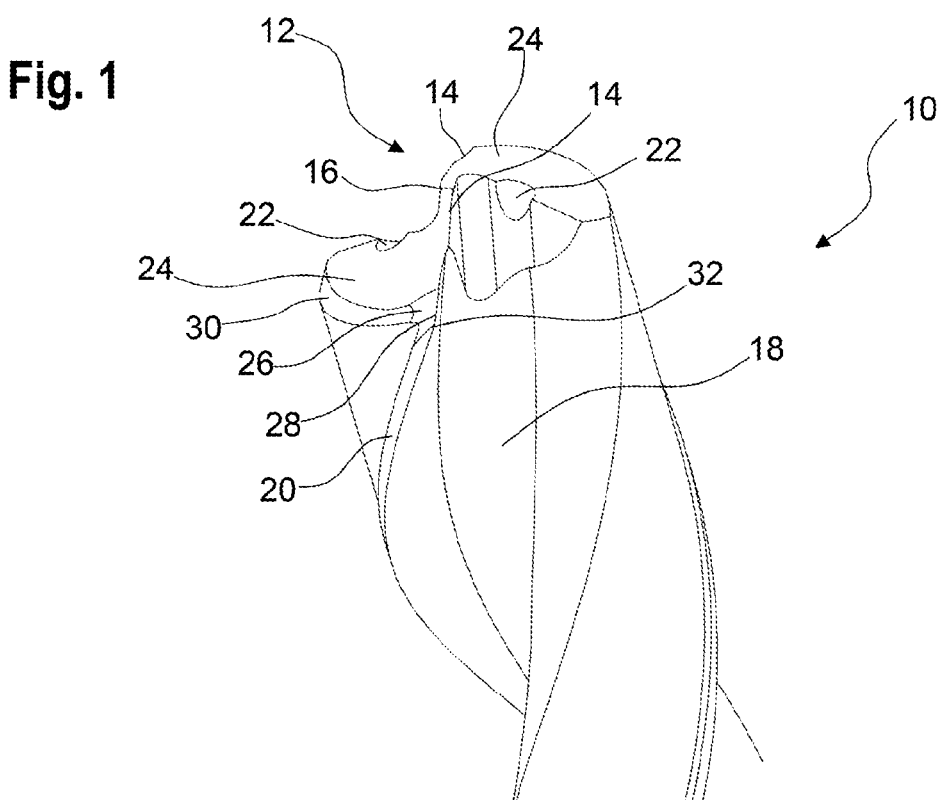
FIG. 1 a cutting tool according to the invention.

FIG. 1 shows a portion of a cutting tool 10 according to the invention in a perspective view. The cutting tool 10 is suitable for the rotational machining of workpieces made of metal. More specifically, the cutting tool 10 is a twist drill.

The cutting tool 10 has a cutting tip 12 with two main cutting edges 14, which in particular extend parallel to one another.

The cutting tool 10 also has a chisel edge 16, which connects the main cutting edges 14.

When machining a workpiece, the main cutting edges 14 take over the actual drilling process and cut the material of a machined workpiece. The chisel edge 16 has a scraping effect and increases the required working pressure on the cutting tool 10.

The cutting tool 10 also comprises two flutes 18 for evacuating metal chips away from the cutting tip 12.

The cutting tool 10 further comprises two guide bevels 20. The guide bevels 20 are used to guide the cutting tool 10 when machining a workpiece in a produced bore. The guide bevels 20 in particular serve to improve a concentricity of the cutting tool 10.

In addition, the cutting tool 10 comprises two cooling channels 22, to transport coolant to the cutting tip 12 or to the main cutting edge 14.

Adjacent to the main cutting edge 14, the cutting tool 10 has a free surface 24, which is also referred to as the main free surface.

There is also a flank face 26, which adjoins the main cutting edge 14 radially to the outside and can be regarded as a secondary free surface.

The main cutting edge 14 thereby merges into an edge 28 of the flank face 26, in particular into an edge 28 which, viewed in the direction of rotation of the cutting tool 10, is located in the front. This edge 28 can be curved, in particular curved convexly.

In addition to the main cutting edge 14, the guide bevel 20 and a back-milling 30 extend into the flank face 26 as well.

As can be seen in FIG. 1, the flank face 26 is at least approximately L-shaped.

Starting from the main cutting edge 14, a flank angle of the flank face 26 increases in a radially outward direction. More specifically, the flank angle increases along the edge 28. In other words, the flank angle 26 increases in the direction toward a cutting corner 32. The cutting tool 10 consequently has more clearance when machining a workpiece, which reduces the wear on the cutting tool 10 and extends the service life of the cutting tool 10.

The flank angle in particular increases continuously.

Figure 2:
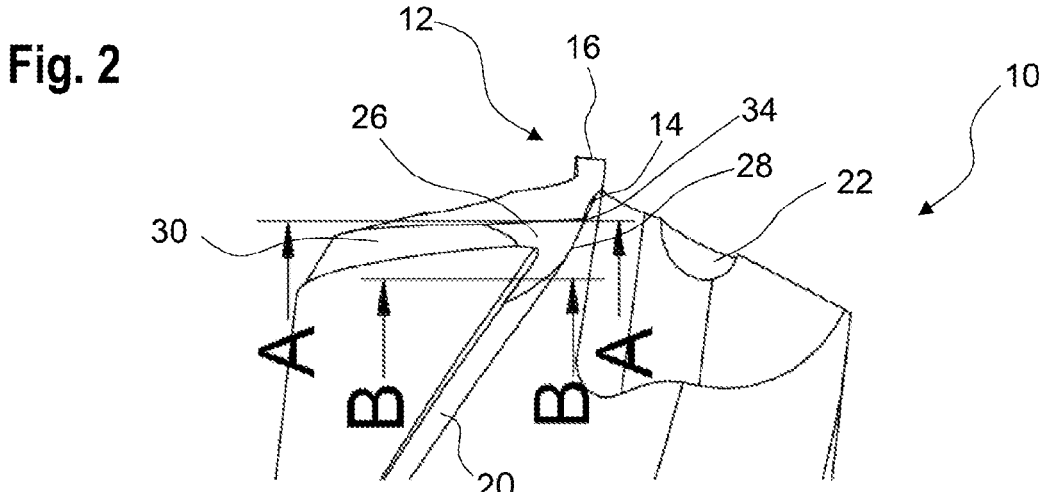
FIG. 2 an enlarged view of the cutting tool of FIG. 1 in the area of a cutting tip, FIG. 3 a section through the cutting tool along the Line A-A in FIG. 2, FIG. 4 a section through the cutting tool along the Line B-B in FIG. 2, FIG. 5 a partial view of the cutting tool in the area of the flank face, FIG. 6 a partial view of the cutting tool in the area of the main cutting edge, FIG. 7 a section through the cutting tool along the Line C-C in FIG. 6, and FIG. 8 a section through the cutting tool along the Line D-D in FIG. 6.

FIG. 2 additionally shows the cutting tool 10 of FIG. 1 in a lateral view.

Figure 3:
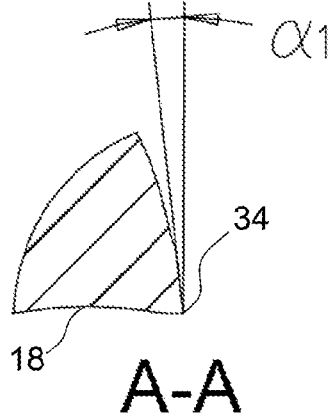
Figure 4:
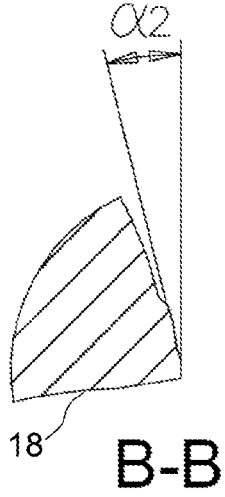

The alignment of the flank face 26 is explained in more detail with the aid of FIGS. 3 and 4.

FIG. 3 shows a partial section through the cutting tool 10 along the Line A-A of FIG. 2. The section A-A extends through an end point 34 of the edge 28, which is closest to the cutting tip 12.

FIG. 4 shows a partial section through the cutting tool 10 along the Line B-B of FIG. 2. Section B-B extends through the flank face 26 below the edge 28.

A comparison of FIGS. 3 and 4 shows that, starting from an end point 34 of the edge 28, the flank angle increases from a value $\alpha_1$ to a value $\alpha_2$.

The flank angle increases at least 2°, for example, in particular at least 4°, for example from 8° to 12°.

The sectional plane in which the flank angle is measured is perpendicular or approximately perpendicular to the longitudinal axis of the cutting tool 10.

The flank angle is measured in the sectional plane relative to a perpendicular that extends perpendicular to a surface of the flute 18 at the transition from the flute 18 to the flank face 26 or the guide bevel 20.

Figures 5, 6:
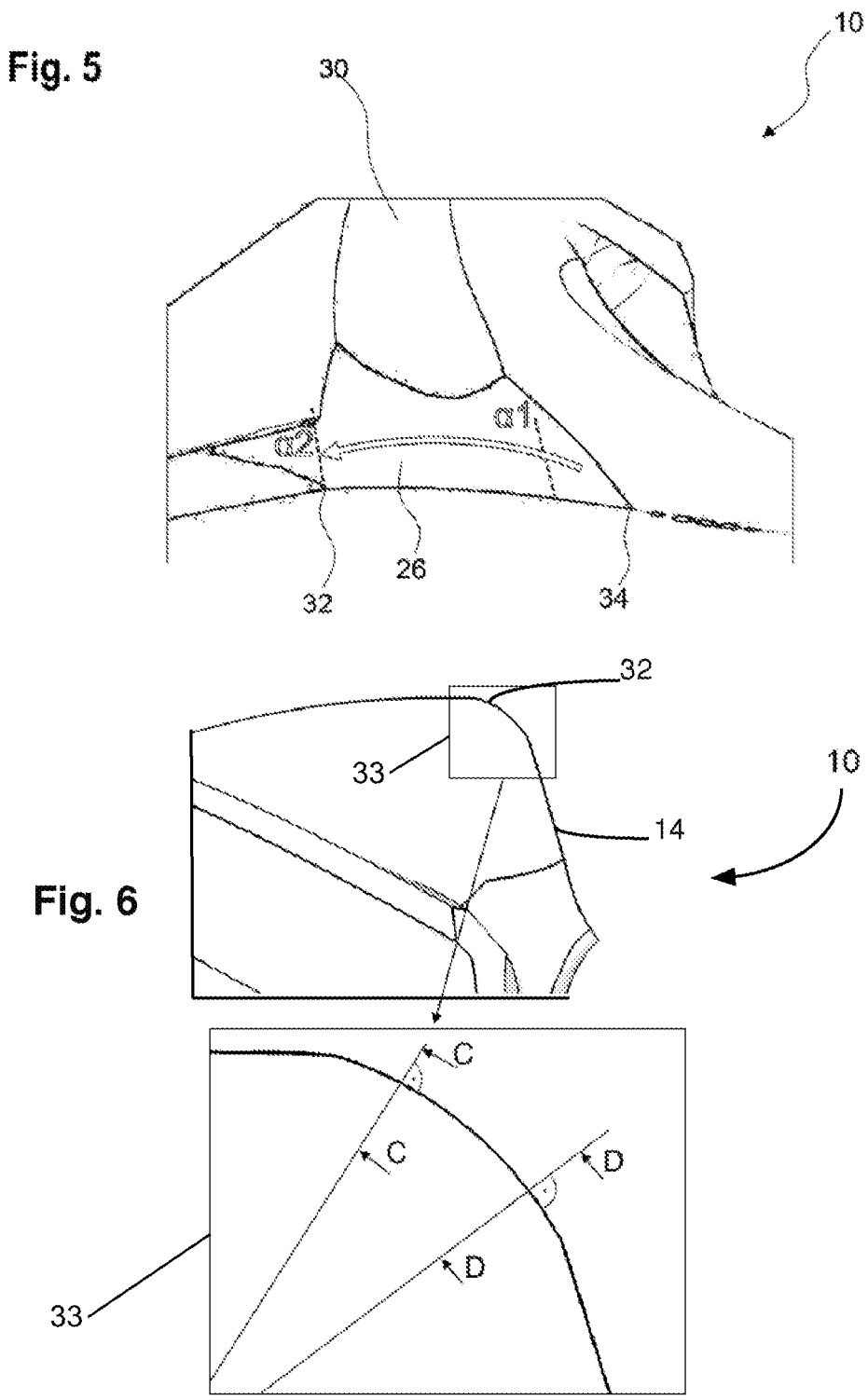

FIG. 5 additionally shows a further partial view of the cutting tool in the area of the flank face 26. This view illustrates the increase of the flank angle from a value $\alpha 1$ to a value $\alpha 2$.

Since the flank face 26 slopes away radially outward, the flank angle does not only increase when viewed in radial direction, but also when viewed in axial direction.

A corner radius 33, which extends between the cutting corner 32 and the end point 34, is preferably not tangent to the periphery and to the free surface 24.

Figure 7:
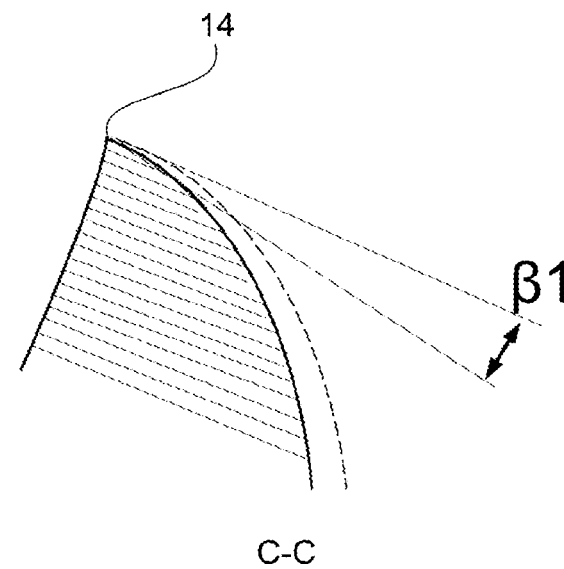
Figure 8:
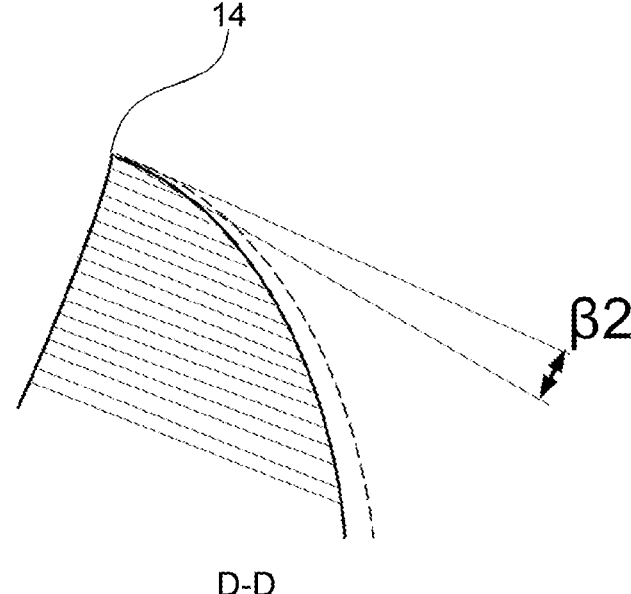

FIGS. 6 to 8 illustrate the effective flank angle, which is measured in a section perpendicular to the main cutting edge 14.

FIG. 6 shows a partial view of the cutting tool 10 in the area of the main cutting edge 14.

FIGS. 7 and 8 respectively show a section perpendicular to the main cutting edge 14 along the Line C-C or D-D in FIG. 6.

The flank angle can also be measured in the section perpendicular to the main cutting edge 14, whereby, here too, the flank angle increases along the main cutting edge 14 from radially inside to radially outside, in particular in the direction toward the cutting corner 32.

The angle $\beta 1$, which is measured in the section along Line C-C, is in particular greater than the angle $\beta 2$, which is measured in the section along Line D-D.

As can be seen from the previous description, there are various ways of measuring the flank angle. In any case, the flank angle increases from radially inside to radially outside.

The invention claimed is:

1. A cutting tool for the rotary machining of workpieces, wherein the cutting tool has a direction of rotation during use, the cutting tool comprising:
   a cutting tip which has at least one main cutting edge and at least one free surface,
   wherein a flank face adjoins the main cutting edge radially outward from the main cutting edge,
   wherein the main cutting edge merges into an edge of the flank face and extends to a cutting corner,
   wherein a flank angle of the flank face continuously increases in a radially outward direction to the cutting corner;
   wherein a corner radius extends between an end point of the edge of the flank face and the cutting corner;
   wherein the flank angle increases from the end point of the edge of the flank face to the cutting corner; and
   wherein the cutting tool is a twist drill and wherein the workpieces are made of metal.

2. The cutting tool according to claim 1, wherein the flank angle increases by at least 2°.

3. The cutting tool according to claim 1, wherein the flank angle increases by at least 4°.

4. The cutting tool according to claim 1, wherein the corner radius is not tangent to a periphery and/or the at least one the free surface.

5. A cutting tool for the rotary machining of workpieces, wherein the cutting tool has a direction of rotation during use, the cutting tool comprising:

a cutting tip which has at least one main cutting edge and at least one free surface, wherein a flank face adjoins the main cutting edge radially outward from the main cutting edge, wherein the main cutting edge merges into an edge of the flank face and extends to a cutting corner, wherein a flank angle of the flank face continuously increases in a radially outward direction to the cutting corner;

wherein the flank angle increases from an end point of the edge of the flank face to the cutting corner;

wherein the cutting tool is a twist drill and wherein the workpieces are made of metal.

6. The cutting tool according to claim 5, wherein the flank angle increases by at least 2°.

7. The cutting tool according to claim 5, wherein the flank angle increases by at least 4°.

8. A cutting tool for the rotary machining of workpieces, wherein the cutting tool has a direction of rotation during use, the cutting tool comprising:

a cutting tip which has at least one main cutting edge and at least one free surface, wherein a flank face adjoins the main cutting edge radially outward from the main cutting edge, wherein the main cutting edge merges into an edge of the flank face and extends to a cutting corner, wherein a flank angle of the flank face continuously increases in a radially outward direction to the cutting corner;

wherein a convex corner radius extends between an end point of the edge of the flank face and the cutting corner;

wherein the flank angle increases from the end point of the edge of the flank face to the cutting corner; and wherein the cutting tool is a twist drill and wherein the workpieces are made of metal.

9. The cutting tool according to claim 8, wherein the flank angle increases by at least 2°.

10. The cutting tool according to claim 8, wherein the flank angle increases by at least 4°.

11. The cutting tool according to claim 8, wherein the corner radius is not tangent to a periphery and/or the free surface.

* * * * *